US011292452B2

(12) United States Patent
Syed et al.

(10) Patent No.: US 11,292,452 B2
(45) Date of Patent: Apr. 5, 2022

(54) METHODS AND SYSTEM FOR ADJUSTING RESPONSES OF AN ELECTRIC MACHINE AND AN ENGINE

(71) Applicant: Ford Global Technologies, LLC, Dearborn, MI (US)

(72) Inventors: Fazal Urrahman Syed, Canton, MI (US); Rajit Johri, Canton, MI (US); Justin Panhans, Detroit, MI (US); Minku Lee, Ypsilanti, MI (US); Joshua Nicholas Dewalt, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 16/438,179

(22) Filed: Jun. 11, 2019

(65) Prior Publication Data

US 2020/0391723 A1    Dec. 17, 2020

(51) Int. Cl.
*B60W 20/40*    (2016.01)
*B60W 10/02*    (2006.01)
*B60W 10/08*    (2006.01)
*B60W 10/06*    (2006.01)

(52) U.S. Cl.
CPC ............ *B60W 20/40* (2013.01); *B60W 10/02* (2013.01); *B60W 10/06* (2013.01); *B60W 10/08* (2013.01); *B60W 2510/244* (2013.01); *B60W 2710/0666* (2013.01)

(58) Field of Classification Search
CPC ...... B60W 20/00; B60W 20/10; B60W 20/40; B60W 10/00; B60W 10/02; B60W 10/04; B60W 10/06; B60W 10/08; B60W 2510/00; B60W 2510/24; B60W 2510/242; B60W 2510/244; B60W 2710/00; B60W 2710/06; B60W 2710/0666
See application file for complete search history.

(56) References Cited

U.S. PATENT DOCUMENTS

| | | | |
|---|---|---|---|
| 9,981,651 | B2 | 5/2018 | Johri et al. |
| 2005/0252283 | A1 | 11/2005 | Heap et al. |
| 2007/0142166 | A1* | 6/2007 | Gebby ................ B60W 30/188 477/15 |
| 2013/0151044 | A1 | 6/2013 | Lee |
| 2017/0225670 | A1 | 8/2017 | Johri et al. |
| 2018/0029587 | A1 | 2/2018 | Johri et al. |

* cited by examiner

*Primary Examiner* — Tyler J Lee
*Assistant Examiner* — Michael Allen Brace, Jr.
(74) *Attorney, Agent, or Firm* — David Kelley; McCoy Russell LLP (57) ABSTRACT

Systems and methods for operating a vehicle that includes an engine and an electric machine are described. In one example, torque requests are aligned in time to compensate for a delay that may be caused by broadcasting one or more torque commands over a controller area network or another type of communication link. The torque requests may be aligned via delaying an engine torque request and predicting an electric machine torque.

20 Claims, 5 Drawing Sheets

METHODS AND SYSTEM FOR ADJUSTING RESPONSES OF AN ELECTRIC MACHINE AND AN ENGINE

FIELD

The present description relates to methods and a system for a hybrid vehicle that includes an internal combustion engine and an electric machine for propelling a vehicle.

BACKGROUND AND SUMMARY

An internal combustion engine and an electric machine may be included in a hybrid vehicle to provide propulsion torque. The internal combustion engine and the electric machine may be issued torque or power commands that may be based on driver demand input torque or power and vehicle operating conditions. A vehicle system controller, transmission controller, and engine controller may reside together in a single module while an electric machine controller may reside in a separate module. Consequently, when a change in a torque request is made, a new torque request may be issued immediately to the engine controller and a new torque request may be broadcast to the electric machine controller via a controller area network (CAN) communications link. Broadcasting the electric machine torque commands over the CAN may delay delivery of torque via the electric machine. Consequently, a change of engine torque may begin sooner than a change of electric machine torque. The response delay of the electric machine may reduce system efficiency because the engine torque may be reduced for an extended period of time as compared to the electric machine torque reduction. Further, delivering the engine and electric machine torques at different times may result in an actual torque converter impeller torque that does not match a desired or requested torque converter impeller torque, which may cause driveline torque disturbances. Vehicle occupants may find the driveline torque disturbances to be annoying. Therefore, it may be desirable to provide a way of issuing engine and electric machine torque commands that meets requested torque converter impeller torque. Further, it may be desirable to respond to engine and electric machine requested torque changes in a way that allows the engine torque response and the electric machine torque response to follow a desired timing between engine and electric machine torque commands so that the possibility of driveline torque disturbances may be reduced.

The inventors herein have recognized the above-mentioned issues and have developed a powertrain operating method, comprising: adjusting a modified requested arbitrated engine torque to an engine instantaneous arbitrated torque request during a first condition; and adjusting the modified requested arbitrated engine torque to a maximum of the engine instantaneous arbitrated torque request or a requested engine instantaneous torque during a second condition.

By adjusting a modified requested arbitrated engine torque to a requested engine instantaneous torque, it may be possible to provide the technical result of timing engine torque response and electric machine torque response such that the electric torque machine response aligns with or leads the engine torque response. Specifically, the electric machine torque may be adjusted to a value that is based on the modified requested arbitrated engine torque so that electric machine torque may be commanded sooner than the engine torque in response to a request for reduced driveline torque. As such, the actual electric machine torque may more closely align with a time when the actual engine torque changes to meet the request for reduced driveline torque. Therefore, the engine torque may not have to be reduced for an extended period of time via spark retard, thereby improving driveline efficiency. Further, the actual torque converter impeller torque may be closer to the requested or desired torque converter torque. Consequently, the possibility of driveline torque disturbances may be reduced.

The present description may provide several advantages. In particular, the approach may provide a driveline torque that is closer to a requested driver demand torque. Further, the approach may improve driveline efficiency via operating an engine with spark retard for a shorter time duration. In addition, the approach may be reduce the possibility of driveline torque disturbances.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a hybrid vehicle that includes an engine and an electric machine. The engine may be controlled via an engine controller that is included in a same module as a vehicle system controller. The electric machine may be controlled via a controller that is separate and remote from the vehicle system controller. The vehicle system controller may communicate to the electric machine via a controller area network. Commands that are sent to the electric machine controller may be delayed via the controller area network. The engine may be of the type shown in FIG. 1. The engine and the electric machine may be included in a driveline as shown in FIG. 2. Prior art systems may exhibit the torque delays and characteristics shown in FIG. 3. A method to compensate for a torque delay that may be caused by a communication system and other issues is shown in FIG. 4. The method of FIG. 4 may provide the operating sequence of FIG. 5 to improve vehicle drivability and efficiency.

Figure 1:
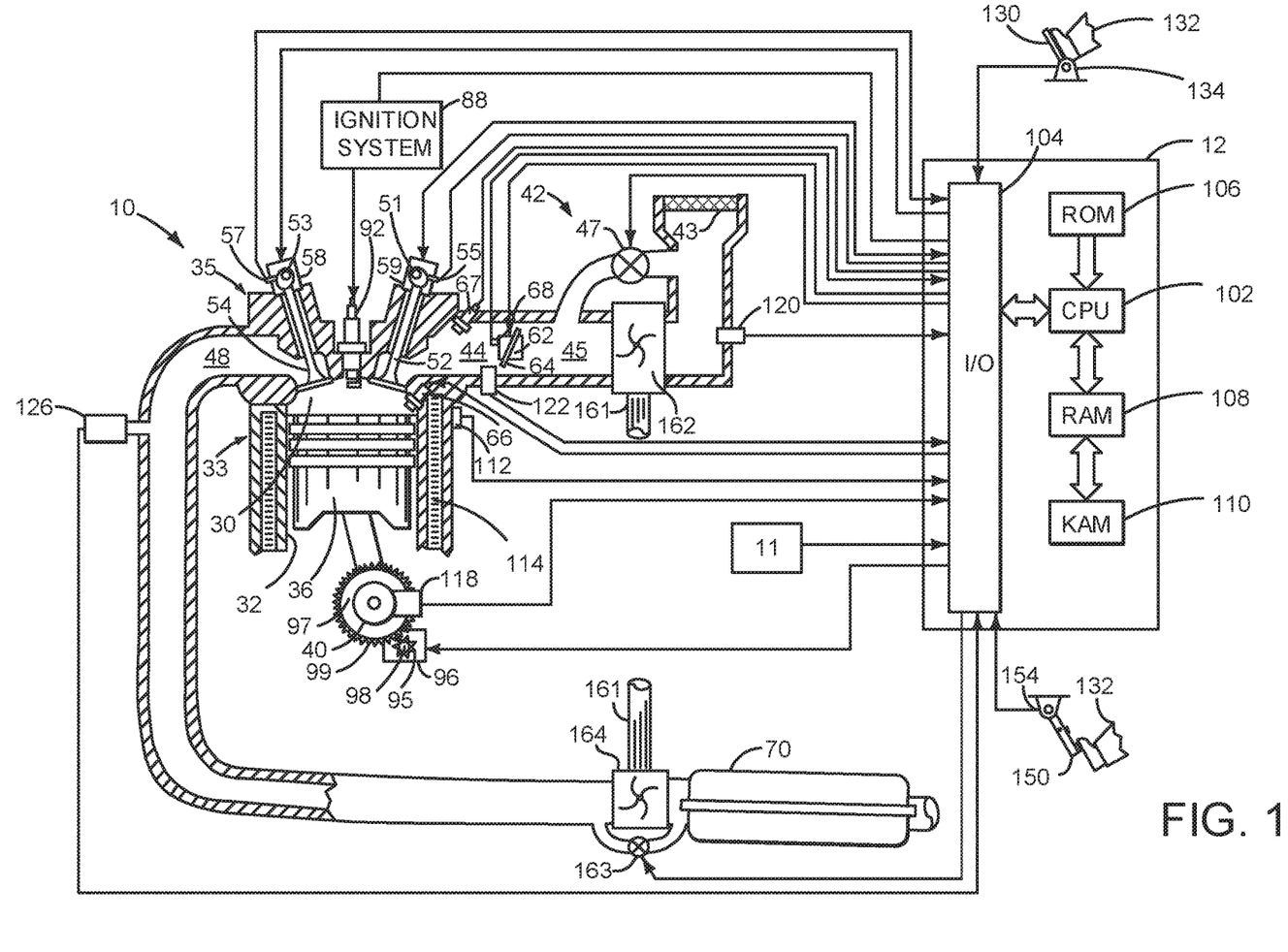
FIG. 1 is a schematic diagram of an engine.
Figure 2:
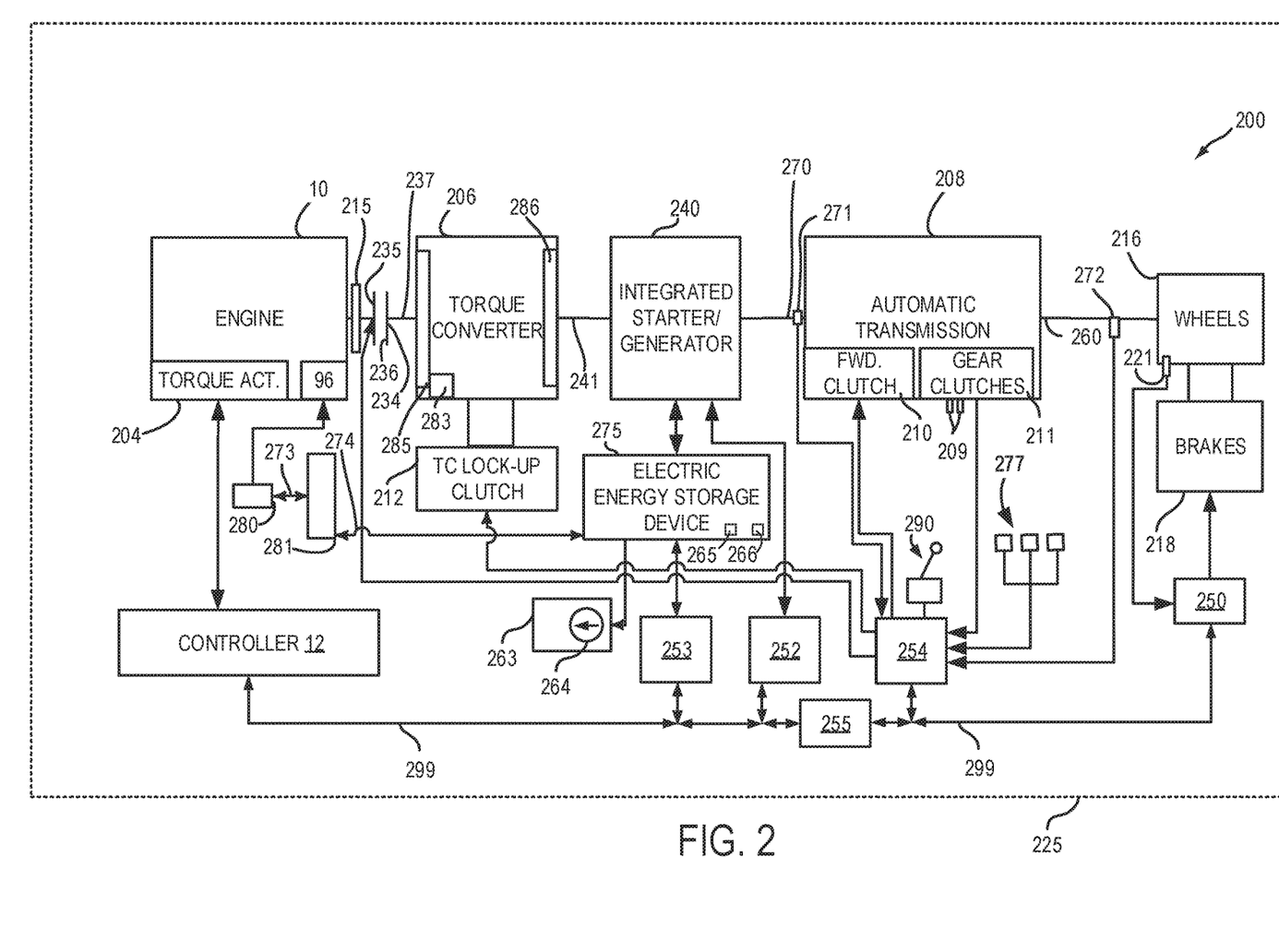
FIG. 2 is a schematic diagram of a vehicle driveline that includes the engine of FIG. 1.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions. In one example, vehicle system controller 255 and engine controller 12 are contained within a single module so that vehicle system controller 255 may communicate with engine controller 12 directly and without CAN 299.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, and transmission controller 254. The electric machine controller and the brake controller 250 may be standalone controllers. Alternatively, the vehicle system controller 255 and the engine controller 12 may reside within a single electronic module while the electric machine controller 252, the transmission controller 254, and the brake controller 250 are standalone controllers.

In this example, powertrain 200 may be powered by engine 10 and/or electric machine 240. Engine 10 may be started via optional engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

Bi-directional DC/DC converter 281 may transfer electrical energy from a high voltage buss 274 to a low voltage buss 273 or vice-versa. Thus, low voltage battery 280 may be charged via a high voltage electric energy storage device 275. Low voltage battery 280 is electrically coupled to low voltage buss 273. Electric energy storage device 275 is electrically coupled to high voltage buss 274. Voltage of electric energy storage device 275 may be determined via voltage sensor (e.g., analog to digital converter) 265 and the amount of current entering or exiting the electric energy storage device 275 may be determined via current sensor 266. High voltage electric energy storage device 275 may supply electric power to air conditioning or climate control system 263. Climate control system may include an electrically driven compressor 264 that compresses a refrigerant (not shown) for cooling and/or heating a passenger compartment (not shown). Low voltage battery 280 (e.g., the voltage of battery 280 is less than the voltage of electric energy storage device 275 when both devices are fully charged) selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to torque converter impeller 285 via shaft 237. Disconnect clutch 236 may be fully closed when engine 10 is supplying power to vehicle wheels 216. Disconnect clutch 236 may be fully open when engine 10 is stopped (e.g., not combusting fuel).

Torque converter 206 includes a turbine 286 to output power to shaft 241. Input shaft 241 mechanically couples torque converter 206 to ISG 240. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission. Torque may be transferred via fluid from impeller 285 to 286.

When torque converter lock-up clutch 212 is fully disengaged, torque converter 206 transmits engine power to automatic transmission 208 via fluid transfer between the torque converter turbine 286 and torque converter impeller 285 or vice-versa, thereby enabling torque multiplication. In contrast, when torque converter lock-up clutch 212 is fully engaged, the engine output power may be directly transferred via the torque converter clutch to an input shaft 241 of ISG 240. Alternatively, the torque converter lock-up clutch 212 may be partially engaged, thereby enabling the amount of engine torque directly relayed to the ISG to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that may pressurize fluid to operate disconnect clutch 236, forward clutch 210, and gear clutches 211. Pump 283 is driven via impeller 285, which rotates at a same speed as ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the input shaft 270 of automatic transmission 208. The upstream side of the ISG 240 is mechanically coupled to the turbine 286 of torque converter 206. ISG 240 may provide a positive power or a negative power to powertrain 200 via operating as a motor or generator as instructed by electric machine controller 252.

ISG 240 may rotate turbine 286, which in turn may rotate impeller 285 to start engine 10 during engine starting. TCC 212 may be fully open when ISG 240 is cranking engine 10 so that torque of ISG 240 may be multiplied. Alternatively, TCC 212 may be partially open when ISG 240 is cranking engine 10 to manage torque transfer to engine 10. ISG 240 may rotate at a greater speed than engine 10 during engine cranking.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the engine torque that flows through torque converter 206 and ISG torque is less than a transmission input torque limit (e.g., a threshold value not to be exceeded), the torque is delivered to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging power (e.g., a negative ISG torque that may resist driveline rotation) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque (e.g., desired or requested powertrain wheel torque) based on vehicle speed and brake pedal position. Vehicle system controller 255 then allocates a fraction of the negative desired wheel torque to the ISG 240 and the engine 10. Vehicle system controller may also allocate a portion of the requested braking torque to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative torque to transmission input shaft 270, but negative torque provided by ISG 240 and engine 10 may be limited by transmission controller 254 which outputs a transmission input shaft negative torque limit (e.g., not to be exceeded threshold value). Further, negative torque of ISG 240 may be limited (e.g., constrained to less than a threshold negative threshold power) based on operating conditions of electric energy storage device 275, by vehicle system controller 255, or electric machine controller 252. Any portion of desired negative wheel torque that may not be provided by ISG 240 because of transmission or ISG limits may be allocated to engine 10 and/or friction brakes 218 so that the desired wheel torque is provided by a combination of negative torque (e.g., torque absorbed) via friction brakes 218, engine 10, and ISG 240.

Accordingly, torque or power control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. Engine braking torque or negative engine torque may be provided by rotating the engine with the engine generating torque that is insufficient to rotate the engine. Thus, the engine may generate a braking torque via operating at a low torque while combusting fuel, with one or more cylinders deactivated (e.g., not combusting fuel), or with all cylinders deactivated and while rotating the engine. The amount of engine braking torque may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., threshold negative wheel torque not to be exceeded) to the vehicle system controller 255 so that negative ISG power does not cause the wheel power limit to be exceeded. For example, if controller 250 issues a negative wheel torque limit of 50 Newton-meters (Nm), ISG torque is adjusted to provide less than 50 Nm (e.g., 49 Nm) of negative torque at the wheels, including compensating for transmission gearing.

Thus, the system of FIGS. 1 and 2 provides for a system, comprising: an engine in a hybrid vehicle driveline; an electric machine in the hybrid driveline; a driveline disconnect clutch that selectively couples the engine to the electric machine; a first controller including executable instructions stored in non-transitory memory to adjust a modified requested arbitrated engine torque to an engine instantaneous arbitrated torque request during a first condition, and executable instructions to adjust the modified requested arbitrated engine torque to a maximum of the engine instantaneous arbitrated torque request or a requested engine instantaneous torque during a second condition, and executable instructions to send a motor torque request via a controller area network (CAN); and a second controller including executable instructions stored in non-transitory memory to receive the motor torque command via the CAN. The system includes where the second controller is an electric machine controller. The system includes where the second controller is coupled to the first controller via the CAN. The system further comprises additional executable instructions stored in non-transitory memory of the first controller to delay a change to an engine instantaneous torque request. The system includes where the delay begins at a time when a transmission controller requests a transmission input torque adjustment. The system includes where the delay ends at a predetermined time after the delay begins.

Figure 3:
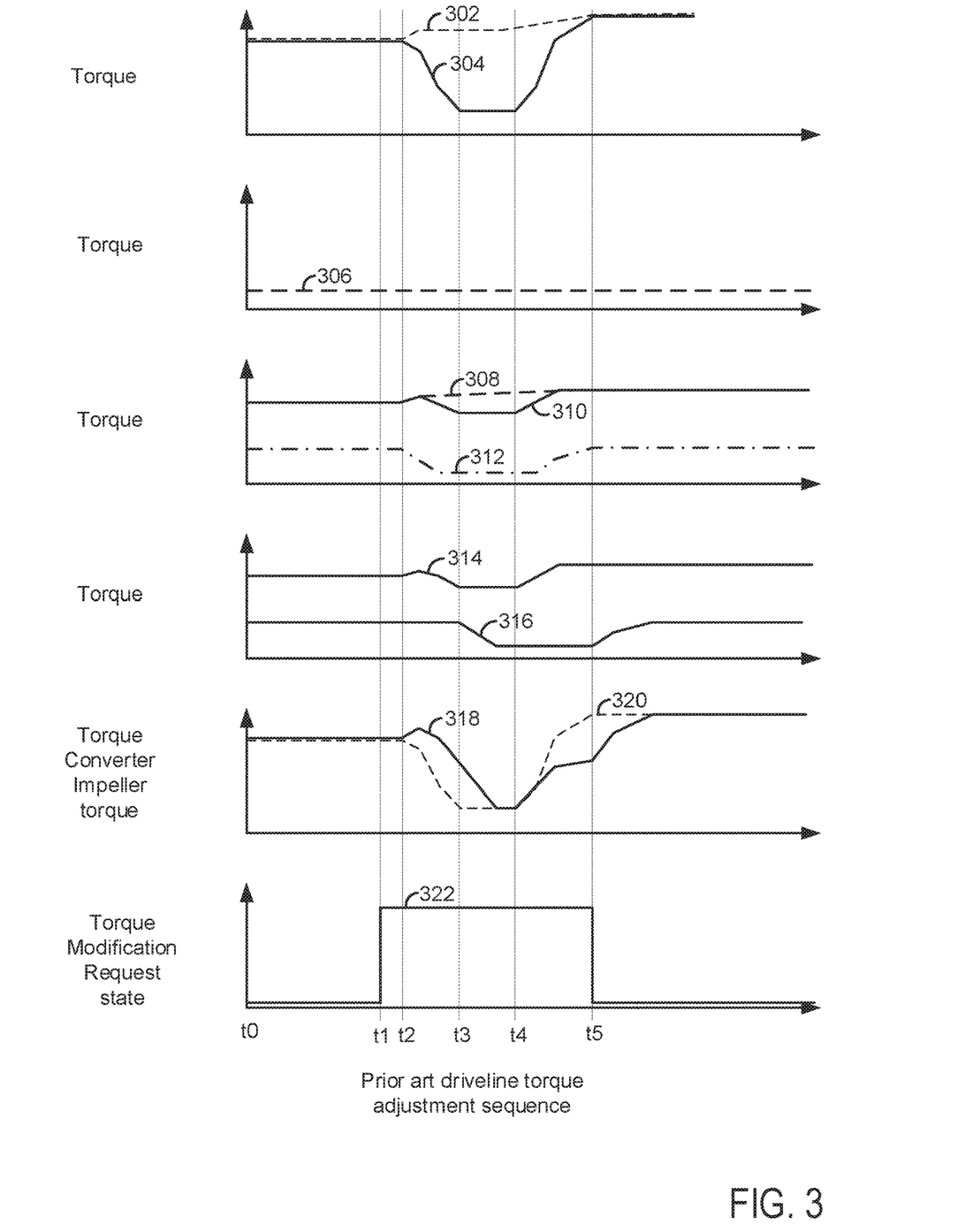
FIG. 3 shows an example prior art sequence to reduce driveline torque.
Figure 4:
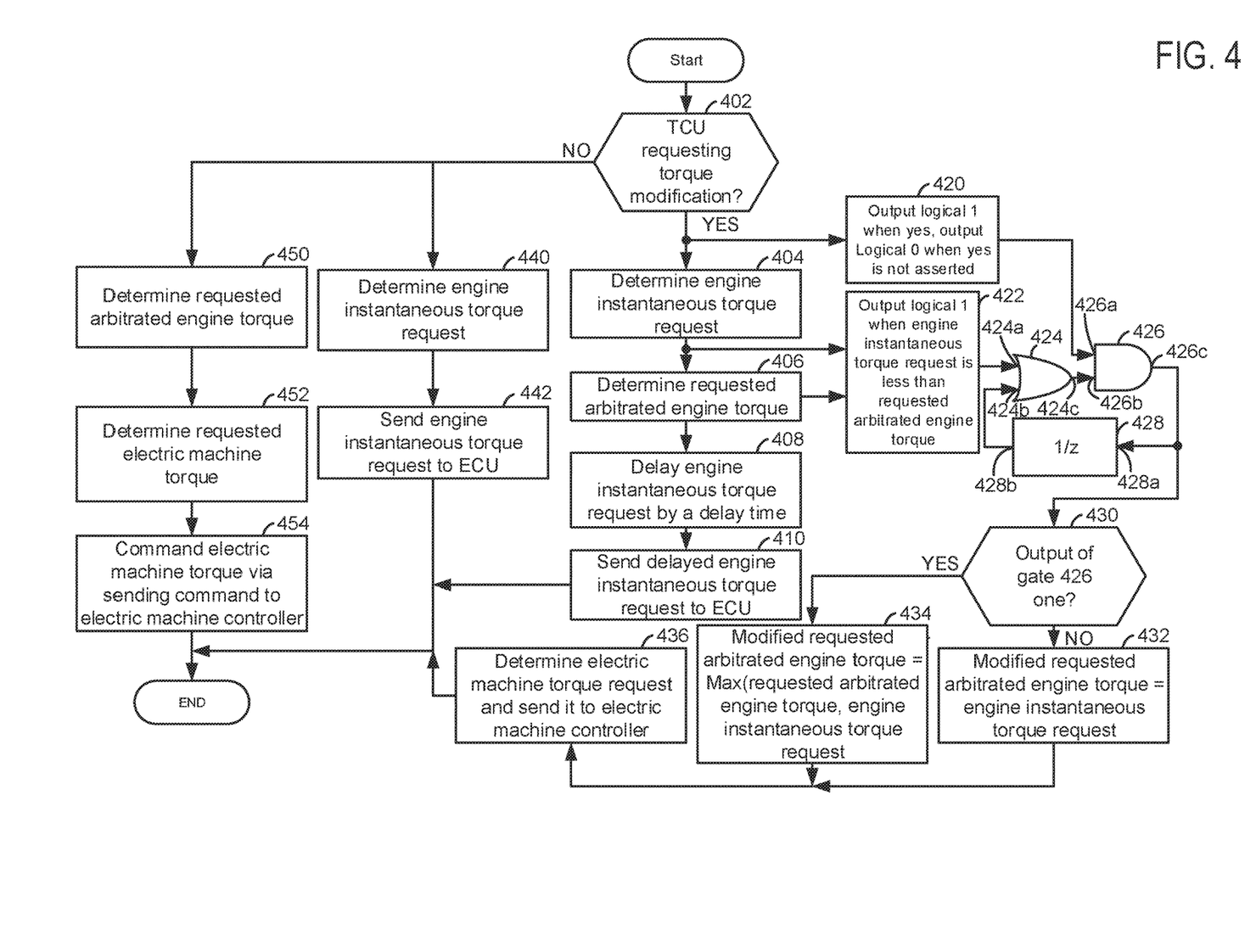
FIG. 4 shows a method for operating a driveline that includes an electric machine and an engine.

Referring now to FIG. 3, plots of a prophetic vehicle operating sequence according to the prior art is shown. The plots are aligned in time and occur at a same time. The vertical lines at t0-t5 show particular times of interest.

The first plot from the top of FIG. 3 is a plot of a base driver demand torque request and an instantaneous driver demand torque request versus time. The vertical axis represents the torque value or amount of the request. The horizontal axis represents time and the time increases from the left side of the figure to the right side of the figure. Trace 302 represents the base driver demand torque request and trace 304 represents the instantaneous driver demand torque request.

The second plot from the top of FIG. 3 is a plot of an energy management system torque request versus time. The vertical axis represents the torque value or amount of the request. The horizontal axis represents time and the time increases from the left side of the figure to the right side of the figure. Trace 306 represents the energy management system torque request.

The third plot from the top of FIG. 3 is a plot of an engine base torque request, a plot of an instantaneous engine torque request, and a plot of electric machine torque request versus time. The vertical axis represents the torque value or amount of the request. The horizontal axis represents time and the time increases from the left side of the figure to the right side of the figure. Trace 308 represents the base engine torque request, trace 310 represents the instantaneous engine torque request, and trace 312 represents the electric machine torque request.

The fourth plot from the top of FIG. 3 is a plot of actual electric machine torque and actual engine torque versus time. The vertical axis represents the torque value or amount. The horizontal axis represents time and the time increases from the left side of the figure to the right side of the figure. Trace 314 represents the actual engine torque and trace 316 represents the actual electric machine torque.

The fifth plot from the top of FIG. 3 is a plot of a requested torque converter impeller torque and actual torque converter impeller torque versus time. The vertical axis represents the torque value or amount of the request. The horizontal axis represents time and the time increases from the left side of the figure to the right side of the figure. Trace 320 represents the requested torque converter impeller torque and trace 318 represents the actual torque converter torque.

The sixth plot from the top of FIG. 3 is a plot of a driveline torque modification request versus time. The vertical axis represents the state of the driveline torque modification request and driveline torque modification is requested when trace 322 is at a higher level near the vertical axis arrow. The driveline torque modification request is not asserted and driveline torque modification is not requested when trace 322 is at a lower level near the horizontal axis. The horizontal axis represents time and the time increases from the left side of the figure to the right side of the figure. Trace 322 represents the operating state of the driveline torque modification request.

At time t0, the base driver demand torque request and the instantaneous driver demand torque request are at a higher level. The energy management system torque request is at a lower level and driveline torque modification is not requested. The base engine torque request and the instantaneous engine torque request are at higher levels. The electric machine torque request is at a middle level. The actual engine torque is at a higher level and the actual electric machine torque is at a middle level. The desired torque converter impeller torque is at a higher level and the actual torque converter impeller torque is at a higher level.

At time t1, the driveline torque modification is asserted and the levels of the other parameters are unchanged. At time t2, the base driver demand torque request begins to increase by a small amount and the instantaneous driver demand torque request begins to decrease. The energy management system torque request remains at its previous level and driveline torque modification is still requested. The base engine torque request begins to increase by a small amount and the instantaneous engine torque request is also increased by a small amount. The electric machine torque request is reduced. The actual engine torque begins to increase a small amount and the actual electric machine torque is unchanged. The desired torque converter impeller torque begins to be reduced and the actual torque converter impeller torque begins to be increased by a small amount.

Between time t2 and time t3, the base driver demand torque request continues to increase by a small amount and the instantaneous driver demand torque request is decreased significantly. The energy management system torque request remains at its previous level and driveline torque modification is still requested. The base engine torque request increases by a small amount and the instantaneous engine torque request increases briefly and then it decreases. The electric machine torque request is reduced to a lower level where it levels off. The actual engine torque increases briefly and then it decreases. The actual electric machine torque is unchanged. The desired torque converter impeller torque is reduced to a lower level where it levels off. The actual torque converter impeller torque increases briefly and then it begins to be reduced. The actual torque converter impeller torque lags behind the requested torque converter impeller torque.

At time t3, the base driver demand torque request levels off and the instantaneous driver demand torque request levels off at a lower level. The energy management system torque request remains at its previous level and driveline torque modification is still requested. The base engine torque request continues to increase by a small amount and the instantaneous engine torque request levels off at a middle level. The electric machine torque request continues along at a lower level. The actual engine torque levels off at a middle level and the actual electric machine torque begins to be reduced. The desired torque converter impeller torque levels off at a lower level and the actual torque converter impeller torque continues to decrease.

Between time t3 and time t4, the base driver demand torque request continues to increase by a small amount and the instantaneous driver demand torque request is constant at a lower level. The energy management system torque request remains at its previous level and driveline torque modification is still requested. The base engine torque request increases by a small amount and the instantaneous engine torque request is constant at a middle level. The electric machine torque request remains constant at a lower level. The actual engine torque remains constant at a middle level. The actual electric machine torque is reduced to a lower level and then it remains at the lower level. The desired torque converter impeller torque remains constant at a lower level. The actual torque converter impeller torque continues to decrease and then it levels off at a lower level near time t4.

At time t4, the base driver demand torque continues to increase by a small amount and the instantaneous driver demand torque begins to increase. The energy management system torque request remains at its previous level and driveline torque modification is still requested. The base engine torque request continues to increase by a small amount and the instantaneous engine torque request begins to increase. The electric machine torque request remains at its previous level. The actual engine torque begins to increase and the actual electric machine torque continues at its previous level. The desired torque converter impeller torque and the actual torque converter impeller torque begin to increase.

Between time t4 and time t5, the base driver demand torque request continues to increase by a small amount and the instantaneous driver demand torque request continues to increase. The energy management system torque request remains at its previous level and driveline torque modification is still requested. The base engine torque request increases by a small amount and the instantaneous engine torque request increases briefly and then it levels off at a higher level. The electric machine torque request is constant for a time and then it increases. The actual engine torque increases and then it levels off at a higher level. The actual electric machine torque is at its previous level and then it increases. The desired torque converter impeller torque continues to increase. The actual torque converter impeller torque also continues to increase.

At time t5, the base driver demand torque request levels off and the instantaneous driver demand torque request reaches a same level as the base driver demand torque request. The energy management system torque request remains at its previous level and driveline torque modification is withdrawn. The base engine torque request continues at its previous level and the instantaneous engine torque request reaches a same level as the base engine torque request. The electric machine torque request levels off at a middle level. The actual engine torque levels off at a higher level and the actual electric machine continues to increase. The desired torque converter impeller torque levels off at a higher level and the actual torque converter impeller torque continues to increase.

In this way, the actual electric machine torque lags the instantaneous driver demand torque and the actual engine torque. Further, the actual torque converter impeller torque lags the desired torque converter impeller torque. This results in a difference between the actual torque converter impeller torque and the desired or requested torque converter impeller torque. Further, the engine torque is reduced before the electric machine torque so that driveline efficiency may be lower than is desired due to spark retard being used to reduce engine torque for longer than may be desired.

Referring now to FIG. 4, a flow chart of a method for operating a driveline of a vehicle is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 judges if a transmission control unit is requesting a driveline torque modification. A driveline torque modification may be requested in response to a downshift from a higher numeric transmission gear to a lower numeric transmission gear. The driveline torque modification may reduce clutch wear and provide a smoother shift. If method 400 judges that the transmission control unit is requesting a torque modification, the answer is yes and method 400 proceeds to 404 and 420. Otherwise, the answer is no and method 400 proceeds to 450 and 440.

At 450, method 400 determines a requested arbitrated engine torque. In one example, the requested arbitrated engine torque is determined via a requested engine instantaneous torque and a present torque capacity of a driveline disconnect clutch. In particular, the requested arbitrated engine torque is the lower value of the requested engine instantaneous torque and a present torque capacity of a driveline disconnect clutch. The requested engine instantaneous torque is a function of system electrical limits (e.g., battery charge limits and electric machine power limits), requested instantaneous driver demand torque (e.g., determined from accelerator pedal position), and an estimate of actual base engine torque. The present torque capacity of the driveline disconnect clutch may be a function of an amount of force applied to close the driveline disconnect clutch. Method 400 proceeds to 452.

At 452, method 400 determines a requested electric machine torque amount. In one example, the requested electric machine torque amount is requested instantaneous driver demand torque minus the requested arbitrated engine torque determined at 450. In addition, limits may be applied to the requested electric machine torque amount. The limit may be a function of battery state of charge and other vehicle operating parameters. Method 400 proceeds to 454.

At 454, method 400 commands the electric machine to the requested electric machine torque amount by broadcasting a message over a controller area network (CAN) communications link. The electric machine controller adjusts the electric machine to the requested electric machine torque amount. Method 400 proceeds to exit.

At 440, method 400 determines a requested engine instantaneous torque. The requested engine instantaneous torque is a function of system electrical limits (e.g., battery charge limits and electric machine power limits), requested instantaneous driver demand torque (e.g., determined from accelerator pedal position), and an estimate of actual base engine torque. The requested engine instantaneous torque is a fast changing torque value that may be increased or decreased via changing engine spark timing between spark timing values that are retarded from minimum spark timing for best engine torque (MBT) and MBT spark timings. The estimate of actual base engine torque may be determined from intake manifold pressure or engine air flow and engine torque at MBT spark timing and it changes slower over time as compared to the requested engine instantaneous torque. Method 400 proceeds to 442 after the requested engine instantaneous torque is determined.

At 442, method 400 sends the requested engine instantaneous torque to the engine controller. The engine controller adjusts engine torque to the requested engine instantaneous torque via adjusting a torque actuator. Method 400 proceeds to exit.

At 404, method 400 determines the engine instantaneous torque request as described at 440. Method 400 proceeds to 406 and 422.

At 406, method 400 determines a requested arbitrated engine torque as described at 450. Method 400 proceeds to 408 and 422.

At 408, method 400 delays commanding the engine to the requested engine instantaneous torque. In one example, the delay is an amount of time it takes to communicate a command from the vehicle system controller to the electric machine controller. Thus, if it takes 50 milliseconds for an electric machine to react to a torque command that is sent from the vehicle system controller to the electric machine controller, then 50 milliseconds are allowed to pass from a time a new requested engine instantaneous torque value is determined to a time when the new requested engine instantaneous torque value is sent to the engine controller. Method 400 proceeds to 410 after delaying the requested engine instantaneous torque value.

At 410, method 400 sends the requested engine instantaneous torque to the engine control unit (ECU). The engine controller operates the engine at the requested engine instantaneous torque via adjusting an engine torque actuator. Method 400 proceeds to exit.

At 420, a logical level one is generated and applied to a first input 426a of AND gate 426 when the output of step 402 is yes (e.g., when the transmission control unit is requesting a driveline torque modification). A logical level zero is generated and applied to the first input 426a of AND gate 426 when the output of step 402 is no (e.g., when the transmission control unit is not requesting driveline torque modification.

At 422, a logical level one is generated and supplied to a first input 424a of OR gate 424 when the engine instantaneous torque request is less than or equal to the requested arbitrated engine torque. Otherwise, a logical level zero is supplied to the first input 424a of OR gate 424 when the engine instantaneous torque request is not less than the requested arbitrate engine torque. The output 424c of OR gate 424 is input to a second input 426b of AND gate 426. The output 426c of AND gate 426 is supplied to input 418a of digital delay 428 and step 430. The output 428b of digital delay 428 is input to second input 424b of OR gate 424.

The OR gate 424, AND gate 426, and digital delay 428 operate as follows: When first input 426a or second input 426b is at a logical level of zero, the output 426c of AND gate 426 is a logical zero or not asserted. The output 426c of AND gate 426 is a logical one or asserted when first input 426a and second input 426b are at logical one levels. The digital delay 428 delays the logical level at 428b from following the logical level at input 428a by the time of one execution cycle of method 400. The output 424c of OR gate 424 is a logical one level when first input 424a of OR gate 424 is a logical one or when second input 424b of OR gate 424 is a logical one. The output 424c of OR gate 424 is a logical zero when first input 424a of OR gate 424 is a logical zero and second input 424b of OR gate 424 is a logical zero. Thus, if the transmission control unit is not requesting torque modification, then the output of AND gate 426 is zero. However, if the transmission control unit is requesting torque modification and engine instantaneous torque request is less than the requested arbitrated engine torque, then the output of the AND gate 426 is one. Once the output of AND gate 426 is one, the output of AND gate 426 remains a value of one, unless the transmission control unit ceases requesting torque modification, at which time the output of AND gate 426 reverts to a value of zero. The digital delay 428 holds the second input 426a of AND gate 426 at a logical level of one once output 426c of AND gate 426 is a logical level one, thereby temporarily latching the output 426c of AND gate 426 up to a time when the transmission control unit ceases requesting torque modification.

At 430, method 400 judges if the output 426c of AND gate 426 is a logical level of one. If so, the answer is yes and method 400 proceeds to 434. Otherwise, the answer is no and method 400 proceeds to 432.

At 434, method 400 adjusts a modified requested arbitrated engine torque to a maximum of the requested arbitrated engine torque and the engine instantaneous torque request. The operation may be described as: mod_req_arb_et=Max (req_arb_et, e_inst_tor_req), where mod_req_arb_et is the modified requested arbitrated engine torque, req_arb_et is the requested arbitrated engine torque, and e_inst_tor_req is the engine instantaneous torque request. Thus, if the engine instantaneous torque request is 100 Newton-meters and the requested arbitrated engine torque is 75 Newton-meters, then the modified requested arbitrated engine torque is 100 Newton-meters. Method 400 proceeds to 436.

At 432, method 400 adjusts the modified requested arbitrated engine torque to be equal the engine instantaneous torque request. Method 400 proceeds to 436.

At 436, method 400 determines the electric machine torque request and sends it to the electric machine. In one example, the electric machine torque request is equal to the requested instantaneous driver demand torque minus the modified requested arbitrated engine torque. The electric machine is adjusted to the electric machine torque request. Method 400 proceeds to exit.

Thus, the method of FIG. 4 applies the torque modification request signal from the transmission control unit to identify a condition where the transmission is requesting a torque modification to achieve a torque converter impeller desired torque during transmission gar shifting. In this method, the vehicle system controller receives the torque modulation request as an indication to modify torque calculations and processing. The controller computes a base engine torque request and an engine instantaneous torque request from requested instantaneous driver demand torque and energy management torque. As shown in first plot of FIG. 5, during torque modulation (e.g., reduction), the desired impeller torque is first reduced to assist with the transmission gear shift and then it is ramped back up to the requested instantaneous driver demand torque.

According to the present method, during torque modulation when the desired torque converter impeller torque is being ramped down or reduced (e.g., near the beginning of a torque modification request), the engine instantaneous torque request is delayed in an amount that is equal to the communications delay between a time when the vehicle system controller sends a torque modification request to the electric machine controller and the time that the electric machine controller responds to the torque modification request. There are two cases during torque ramp down: case-A) when the engine instantaneous torque request is less than or equal to the requested arbitrated engine torque; case-B) when the engine instantaneous torque request is greater than the requested arbitrated engine torque. The system starts to achieve the reduction in torque due to torque modulation using the electric machine as the reduction in actual engine instantaneous torque is delayed due the delayed engine instantaneous torque request, and thus, the vehicle system controller may achieve the desired impeller torque through the electric machine. Under such conditions, when the electric machine torque request bottoms out to it's a minimum torque limit, then the engine instantaneous torque request starts to reduce. The maximum of the requested arbitrated engine torque and the engine instantaneous torque request is used to compute the modified requested arbitrated engine torque which is used to determine the electric torque request by subtracting it from the desired torque converter impeller torque or the requested instantaneous driver demand torque. For case-a, the modified requested arbitrated engine torque is the maximum of either the engine instantaneous torque request or the actual instantaneous engine torque, which is equal to actual instantaneous engine torque. For case-b, the modified requested arbitrated engine torque is the maximum of either the engine instantaneous torque request or the actual instantaneous engine torque, which is equal to the engine instantaneous torque request. Note that system may start with case-B but will always converge to case-A since the engine instantaneous torque request is delayed before being commanded to the engine, and therefore, actual instantaneous engine torque becomes greater than the engine instantaneous torque request. This will result in making the output of AND gate 426 a logical one for rest of the torque modulation event.

According to the present method, during torque modulation when the desired impeller torque is being ramped up or increased (e.g., near the end of a torque modification request), the engine instantaneous torque request is again delayed in an amount that is equal to the communications delay between a time when the vehicle system controller sends a torque modification request to the electric machine controller and the time that the electric machine controller responds to the torque modification request. There are two cases during torque ramp up: case-C) when the engine instantaneous torque request is greater than the requested arbitrated engine torque; case-D) when the engine instantaneous torque request is less than or equal to the requested arbitrated engine torque. The system starts to achieve the increase in torque due to torque modulation using the engine first as the increase in engine instantaneous torque request is used instead of the delayed request. During this condition, when the engine torque request reaches to the engine base torque request or limit, then the motor torque request starts to increase. Note that since the maximum of the engine instantaneous torque request or the actual instantaneous engine torque is used to compute the arbitrated instantaneous engine torque. The arbitrated instantaneous engine torque is used to determine the electric machine torque request by subtracting it from the desired torque converter impeller torque. The engine instantaneous torque request is applied when the torque modulation torque is increasing, and therefore, the motor torque request does not change until the engine instantaneous torque request reaches the engine base torque request. At this time, the engine instantaneous torque request cannot increase above the base engine torque request and the electric machine torque request starts to increase after this time. For both case-C and case-D, since the output of AND gate 426 is equal to a logical one, the arbitrated instantaneous engine torque, which is the maximum of either the engine instantaneous torque request or the actual instantaneous engine torque, is equal to engine instantaneous torque request until the engine torque request and the actual engine torque reaches the steady state engine base torque request. After this time, the system will choose the maximum of either of the engine instantaneous torque request or the actual instantaneous engine torque.

Thus, the method of FIG. 4 provides for a powertrain operating method, comprising: adjusting a modified requested arbitrated engine torque to an engine instantaneous arbitrated torque request during a first condition; and adjusting the modified requested arbitrated engine torque to a maximum of the engine instantaneous arbitrated torque request or a requested engine instantaneous torque during a second condition. The method includes where the requested engine instantaneous torque is determined responsive to electric machine and electric energy storage device limits, an actual engine torque estimate that is based on engine airflow, and a driver instantaneous torque request. The method includes where the engine instantaneous arbitrated torque request is based on a driveline disconnect clutch torque capacity and the requested engine instantaneous torque. The method includes where the second condition is a transmission controller not requesting a reduction in transmission input torque or when the requested engine instantaneous torque is not less than the engine instantaneous arbitrated torque request. The method includes where the first condition is the transmission controller requesting the reduction in transmission input torque and when the requested engine instantaneous torque request is less than the engine instantaneous arbitrated torque request. The method further comprises determining an electric machine torque request and sending the electric machine torque request to an electric machine controller. The method includes where the first condition and the second condition occur when a transmission controller is requesting a transmission input torque adjustment. The method further comprises determining the engine instantaneous arbitrated torque request in response to the transmission controller is not requesting the transmission input torque adjustment.

The method of FIG. 4 provides for a powertrain operating method, comprising: adjusting a modified requested arbitrated engine torque to an engine instantaneous arbitrated torque request during a first condition; adjusting the modified requested arbitrated engine torque to a maximum of the engine instantaneous arbitrated torque request or a requested engine instantaneous torque during a second condition; and delaying a change to the requested engine instantaneous torque. The method includes where the delaying is performed as a predetermined delay time. The method further comprises changing the requested engine instantaneous torque after the predetermined delay time expires. The method includes where the delay time begins at a time when a transmission controller requests a transmission input torque adjustment. The method includes where the delay time ends a predetermined amount of time after the delay time begins. The method includes communicating the requested engine instantaneous torque to an engine controller in response to the predetermined delay time ending.

Figure 5:
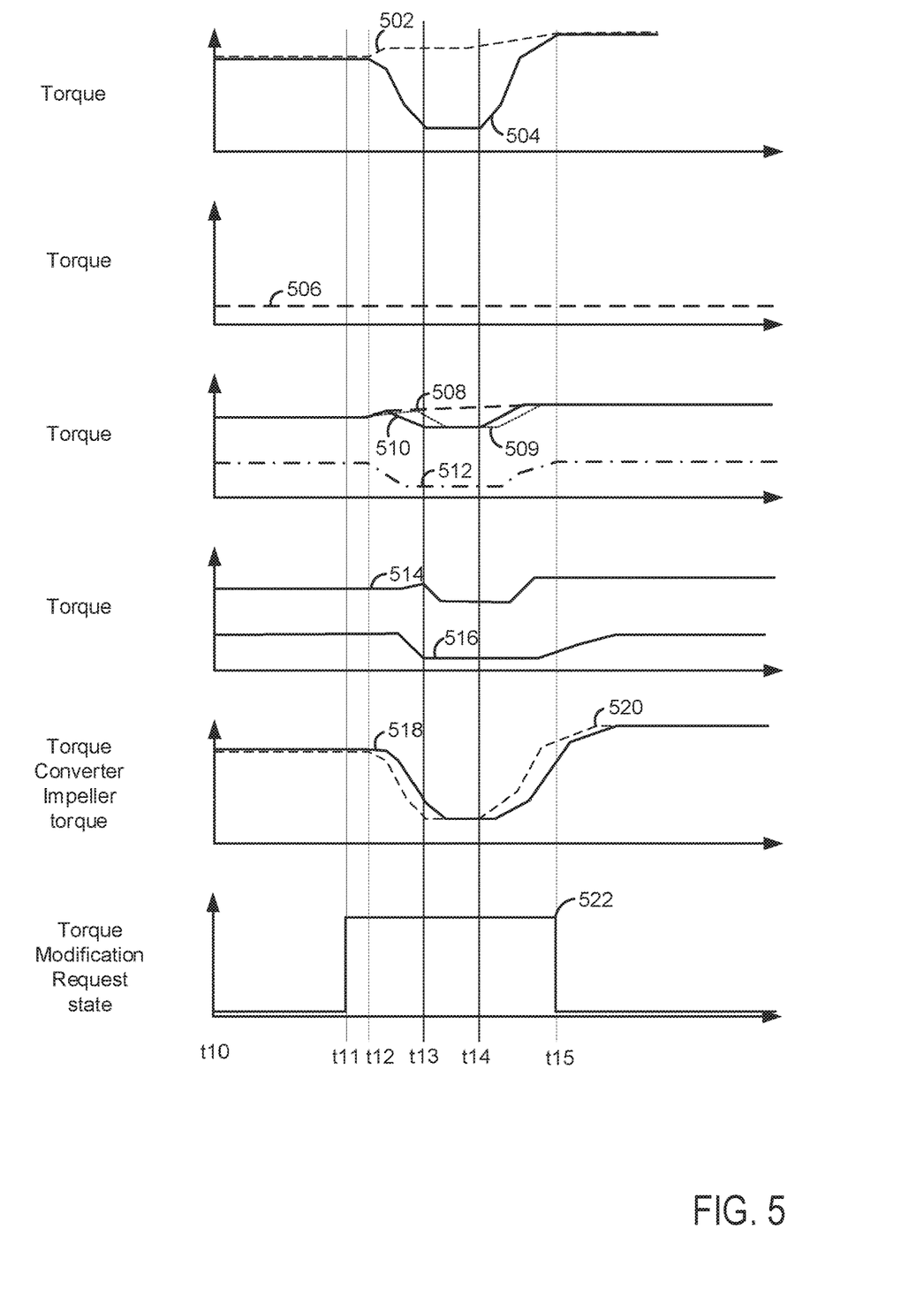
FIG. 5 shows an example sequence according to the method of FIG. 4 where a driver demand torque request is reduced in response to a request from a transmission controller.

Referring now to FIG. 5, plots of a prophetic vehicle operating sequence according to the prior art is shown. The plots are aligned in time and occur at a same time. The vertical lines at t10-t15 show particular times of interest.

The first plot from the top of FIG. 5 is a plot of a base driver demand torque request and an instantaneous driver demand torque request versus time. The vertical axis represents the torque value or amount of the request. The horizontal axis represents time and the time increases from the left side of the figure to the right side of the figure. Trace 502 represents the base driver demand torque request and trace 504 represents the instantaneous driver demand torque request.

The second plot from the top of FIG. 5 is a plot of an energy management system torque request versus time. The vertical axis represents the torque value or amount of the request. The horizontal axis represents time and the time increases from the left side of the figure to the right side of the figure. Trace 506 represents the energy management system torque request.

The third plot from the top of FIG. 5 is a plot of an engine base torque request, a plot of an instantaneous engine torque request, and a plot of electric machine torque request versus time. The vertical axis represents the torque value or amount of the request. The horizontal axis represents time and the time increases from the left side of the figure to the right side of the figure. Trace 508 represents the base engine torque request, trace 509 represents the delayed instantaneous engine torque request, trace 510 represents the instantaneous engine torque request, and trace 512 represents the electric machine torque request.

The fourth plot from the top of FIG. 5 is a plot of actual electric machine torque and actual engine torque versus time. The vertical axis represents the torque value or amount. The horizontal axis represents time and the time increases from the left side of the figure to the right side of the figure. Trace 514 represents the actual engine torque and trace 516 represents the actual electric machine torque.

The fifth plot from the top of FIG. 5 is a plot of a requested torque converter impeller torque and actual torque converter impeller torque versus time. The vertical axis represents the torque value or amount of the request. The horizontal axis represents time and the time increases from the left side of the figure to the right side of the figure. Trace 520 represents the requested torque converter impeller torque and trace 518 represents the actual torque converter torque.

The sixth plot from the top of FIG. 5 is a plot of a driveline torque modification request versus time. The vertical axis represents the state of the driveline torque modification request and driveline torque modification is requested when trace 522 is at a higher level near the vertical axis arrow. The driveline torque modification request is not asserted and driveline torque modification is not requested when trace 522 is at a lower level near the horizontal axis. The horizontal axis represents time and the time increases from the left side of the figure to the right side of the figure. Trace 522 represents the operating state of the driveline torque modification request.

At time t10, the base driver demand torque request and the instantaneous driver demand torque request are at a higher level. The energy management system torque request is at a lower level and driveline torque modification is not requested. The base engine torque request and the instantaneous engine torque request are at higher levels. The electric machine torque request is at a middle level. The actual engine torque is at a higher level and the actual electric machine torque is at a middle level. The desired torque converter impeller torque is at a higher level and the actual torque converter impeller torque is at a higher level.

At time t11, the driveline torque modification is asserted and the levels of the other parameters are unchanged. At time t12, the base driver demand torque request begins to increase by a small amount and the instantaneous driver demand torque request begins to decrease. The energy management system torque request remains at its previous level and driveline torque modification is still requested. The base engine torque request begins to increase by a small amount and the instantaneous engine torque request also begins to increase by a small amount. The delayed instantaneous engine torque request is equal to the instantaneous torque request. The electric machine torque request is begins to be reduced. The actual engine torque remains unchanged and the actual electric machine torque is unchanged. The desired torque converter impeller torque begins to be reduced and the actual torque converter impeller torque begins to be reduced by a small amount.

Between time t12 and time t13, the base driver demand torque request continues to increase by a small amount and the instantaneous driver demand torque request is decreased significantly. The energy management system torque request remains at its previous level and driveline torque modification is still requested. The base engine torque request increases by a small amount and the instantaneous engine torque request increases briefly and then it decreases. Separation develops between the instantaneous engine torque request and the delayed instantaneous torque request. The delayed instantaneous engine torque request is greater than the instantaneous engine torque request. The electric machine torque request is reduced to a lower level where it levels off. The actual engine torque increases. The actual electric machine torque is decreased. The desired torque converter impeller torque is reduced to a lower level. The actual torque converter impeller torque begins to be reduced. The actual torque converter impeller torque lags behind the requested torque converter impeller torque by only a short time and the torque magnitude differences are smaller than those shown in FIG. 3.

At time t13, the base driver demand torque request levels off and the instantaneous driver demand torque request levels off at a lower level. The energy management system torque request remains at its previous level and driveline torque modification is still requested. The base engine torque request continues to increase by a small amount and the instantaneous engine torque request levels off at a middle level. The delayed instantaneous engine torque level begins to decrease. The electric machine torque request continues along at a lower level. The actual engine torque begins to decrease as the delayed instantaneous engine torque begins to decrease and the actual electric machine torque continues at a lower level. The desired torque converter impeller torque continues to decrease and the actual torque converter impeller torque continues to decrease.

Between time t13 and time t14, the base driver demand torque request continues to increase by a small amount and the instantaneous driver demand torque request is constant at a lower level. The energy management system torque request remains at its previous level and driveline torque modification is still requested. The base engine torque request increases by a small amount and the instantaneous engine torque request is constant at a middle level. The delayed instantaneous engine torque request levels off at a middle level. The electric machine torque request remains constant at a lower level. The actual engine torque is reduced and then it remains constant at a middle level. The actual electric machine torque continues at its previous level. The desired torque converter impeller torque levels off and then remains constant at a lower level. The actual torque converter impeller torque continues to decrease and then it levels off.

At time t14, the base driver demand torque continues to increase by a small amount and the instantaneous driver demand torque begins to increase. The energy management system torque request remains at its previous level and driveline torque modification is still requested. The base engine torque request continues to increase by a small amount and the instantaneous engine torque request begins to increase. The delayed instantaneous engine torque request remains at its previous level. The electric machine torque request remains at its previous level. The actual engine torque remains at its previous level and the actual electric machine torque continues at its previous level. The desired torque converter impeller torque begins to increase and the actual torque converter impeller torque continues at its previous level.

Between time t14 and time t15, the base driver demand torque request continues to increase by a small amount and the instantaneous driver demand torque request continues to increase. The energy management system torque request remains at its previous level and driveline torque modification is still requested. The base engine torque request increases by a small amount and the instantaneous engine torque request increases and then it levels off at a higher level. The delayed instantaneous engine torque request increases and it levels off after the instantaneous engine torque request levels off. The electric machine torque request increases and then it levels off at a middle level. The actual engine torque increases and then it levels off at a higher level. The actual electric machine torque is at its previous level and then it begins to increase. The desired torque converter impeller torque continues to increase, and the actual torque converter impeller torque is increased.

At time t15, the base driver demand torque request levels off and the instantaneous driver demand torque request reaches a same level as the base driver demand torque request. The energy management system torque request remains at its previous level and driveline torque modification is withdrawn. The base engine torque request continues at its previous level and the instantaneous engine torque request is at the same level as the base engine torque request. Likewise, the delayed instantaneous engine torque request is at a same level as the base engine torque request. The electric machine torque request is leveled off at a middle level. The actual engine torque is leveled off at a higher level and the actual electric machine continues to increase. The desired torque converter impeller torque continues to increase, and the actual torque converter impeller torque continues to increase.

In this way, the actual electric machine torque initially leads the engine torque adjustment in response to the torque modification request when the instantaneous driver demand torque is decreased. Then, the actual electric machine torque lags the engine torque adjustment in response to the torque modification request when the instantaneous driver demand torque is increased. The timing change is due to the delay in the instantaneous engine torque command. Further, the electric machine torque profile is adjusted according to two different engine torque values so that a smooth torque transition may be provided and so that engine efficiency may be increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A powertrain operating method, performed via a controller, comprising:
adjusting a modified requested arbitrated engine torque to a first torque in response to an engine instantaneous torque request not being less than a requested arbitrated engine torque; and
adjusting the modified requested arbitrated engine torque to a maximum of the requested arbitrated engine torque or the engine instantaneous torque request in response to a transmission controller requesting a driveline torque modification, where the requested arbitrated engine torque is based on a driveline disconnect clutch torque capacity and the engine instantaneous torque request.

2. The method of claim 1, where the engine instantaneous torque request is determined responsive to electric machine and electric energy storage device limits, an actual engine torque estimate that is based in engine airflow, and a driver instantaneous torque request.

3. The method of claim 1, further comprising delaying commanding an engine to the engine instantaneous torque request.

4. The method of claim 1, further comprising adjusting the modified requested arbitrated engine torque to the maximum of the requested engine arbitrated torque or the engine instantaneous torque request in response to the engine instantaneous torque request being less than the requested engine arbitrated torque.

5. The method of claim 4, where the driveline torque modification is based on a downshift.

6. The method of claim 1, further comprising determining an electric machine torque request and sending the electric machine torque request to an electric machine controller.

7. The method of claim 1, further comprising determining a requested electric machine torque in response to the transmission controller not requesting the driveline torque modification, the requested electric machine torque is a requested instantaneous driver demand torque minus the requested arbitrated engine torque.

8. The method of claim 7, further comprising determining the requested arbitrated engine torque in response to the transmission controller not requesting the driveline torque modification.

9. A powertrain operating method, performed via a controller, comprising:
adjusting a modified requested arbitrated engine torque to a maximum of the requested arbitrated engine torque or the engine instantaneous torque request; and
delaying a change to the engine instantaneous torque request, and where the delaying is an amount of time it takes to communicate a command from a first controller to a second controller.

10. The method of claim 9, where the delaying is performed as a predetermined delay time.

11. The method of claim 10, further comprising changing the requested engine instantaneous torque after the predetermined delay time expires.

12. The method of claim 11, where the predetermined delay time begins at a time when a transmission controller requests a transmission input torque adjustment.

13. The method of claim 12, where the predetermined delay time ends a predetermined amount of time after the time when the transmission controller requests the transmission input torque adjustment.

14. The method of claim 13, further comprising communicating the requested engine instantaneous torque to an engine controller in response to the predetermined delay time ending.

15. A system, comprising:
an engine in a hybrid vehicle driveline;
an electric machine in the hybrid vehicle driveline;
a driveline disconnect clutch that selectively couples the engine to the electric machine;
a first controller including executable instructions stored in non-transitory memory to adjust a modified requested arbitrated engine torque to a first torque in response to an engine instantaneous torque request not being less than a requested arbitrated engine torque, and executable instructions to adjust the modified requested arbitrated engine torque to a maximum of the requested arbitrated engine torque or the engine instantaneous torque request in response to a transmission controller requesting the driveline torque modification, and executable instructions to send a motor torque request via a controller area network (CAN); and
a second controller including executable instructions stored in non-transitory memory to receive the motor torque request command via the CAN.

16. The system of claim 15, where the second controller is an electric machine controller.

17. The system of claim 15, where the second controller is coupled to the first controller via the CAN.

18. The system of claim 15, further comprising additional executable instructions stored in non-transitory memory of the first controller to delay a change to the engine instantaneous torque request.

19. The system of claim 18, where the delay begins at a time when a transmission controller requests the transmission input torque adjustment.

20. The system of claim 19, where the delay ends at a predetermined time after the delay begins.

* * * * *